(12) United States Patent
Islam et al.

(10) Patent No.: US 11,573,382 B2
(45) Date of Patent: Feb. 7, 2023

(54) SEALING BOOTS FOR PROTECTING OPTICAL INTERCONNECTIONS AND RELATED ASSEMBLIES

(71) Applicant: CommScope Technologies LLC, Hickory, NC (US)

(72) Inventors: Nahid Islam, Westmont, IL (US); David J. Smentek, Lockport, IL (US); Anthony Leonard LeFebvre, Edina, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/322,621

(22) Filed: May 17, 2021

(65) Prior Publication Data

US 2021/0373260 A1   Dec. 2, 2021

Related U.S. Application Data

(60) Provisional application No. 63/030,693, filed on May 27, 2020.

(51) Int. Cl.
  *G02B 6/42*  (2006.01)
  *G02B 6/44*  (2006.01)

(52) U.S. Cl.
  CPC ......... *G02B 6/4251* (2013.01); *G02B 6/4444* (2013.01)

(58) Field of Classification Search
  None
  See application file for complete search history.

(56) References Cited

U.S. PATENT DOCUMENTS

| | | | |
|---|---|---|---|
| 8,556,520 B2 * | 10/2013 | Elenbaas | G02B 6/387 385/53 |
| 8,708,577 B2 * | 4/2014 | Chan | G02B 6/4284 385/139 |
| 9,270,048 B2 * | 2/2016 | Harwath | H01R 13/5213 |
| 9,494,745 B2 * | 11/2016 | Iizumi | G02B 6/3887 |
| 9,616,602 B2 | 4/2017 | Vaccaro | |
| 9,653,852 B2 * | 5/2017 | Smentek | H01R 13/6592 |
| 9,653,895 B2 | 5/2017 | Vaccaro | |

(Continued)

OTHER PUBLICATIONS

"International Search Report and Written Opinion corresponding to International Application No. PCT/2021/032690 dated Sep. 6, 2021".

(Continued)

*Primary Examiner* — Rhonda S Peace
(74) *Attorney, Agent, or Firm* — Myers Bigel, P.A.

(57) ABSTRACT

The present disclosure describes sealing boots for protecting an optical interconnection. A sealing boot may include a main body having an interior cavity, the interior cavity having an annular recess adjacent to one end of the main body, the annular recess configured to receive a feature of a remote radio unit, and a neck merging with the opposing end of the main body and having a cylindrical inner surface that defines a bore that is continuous with the cavity of the main body, the inner surface having an inner diameter that is less than an inner diameter of the interior cavity of the main body. The sealing boot is configured to surround at least a portion of a fixed active optical connector when the fixed active optical connector is plugged into the remote radio unit.

14 Claims, 11 Drawing Sheets

(56) References Cited

U.S. PATENT DOCUMENTS

| | | | | |
|---|---|---|---|---|
| 9,927,580 | B2* | 3/2018 | Bretz | G02B 6/3817 |
| 10,090,661 | B2* | 10/2018 | Vaccaro | F16J 15/025 |
| 2004/0029433 | A1* | 2/2004 | Lee | H01R 24/564 |
| | | | | 439/445 |
| 2009/0129725 | A1* | 5/2009 | Durrant | G02B 6/4201 |
| | | | | 385/14 |
| 2014/0105552 | A1 | 4/2014 | Sun | |
| 2015/0168657 | A1 | 6/2015 | Islam | |
| 2015/0255921 | A1 | 9/2015 | Gao et al. | |
| 2017/0018871 | A1 | 1/2017 | Vaccaro | |
| 2017/0176690 | A1* | 6/2017 | Bretz | G02B 6/4479 |
| 2019/0386427 | A1* | 12/2019 | Islam | G02B 6/406 |
| 2020/0388954 | A1* | 12/2020 | Liu | H01R 13/5221 |
| 2021/0364715 | A1* | 11/2021 | Islam | G02B 6/4285 |
| 2021/0373260 | A1* | 12/2021 | Islam | G02B 6/4251 |

OTHER PUBLICATIONS

"International Preliminary Report on Patentability corresponding to International Application No. PCT/US2021/032690 dated Dec. 8, 2022".

* cited by examiner

SEALING BOOTS FOR PROTECTING OPTICAL INTERCONNECTIONS AND RELATED ASSEMBLIES

RELATED APPLICATION(S)

The present application claims priority from and the benefit of U.S. Provisional Application Ser. No. 63/030,693, filed May 27, 2020, the disclosure of which is hereby incorporated herein in its entirety.

FIELD

The present application is directed generally toward telecommunications equipment, and more particularly, sealing boots for active optical cable assemblies.

BACKGROUND

Traditional optical assemblies have optical connectors on both ends of the assembly. These assemblies may be connected to a remote radio unit (RRU), remote radio head (RRH) or active antenna at one end and a base band unit (BBU), another RRU, or other telecommunication equipment via a small form-factor pluggable (SFP) optical connector (i.e., the optical assembly is connected to one end of the SFP via an optical connector/adapter and the other end of the SFP (i.e., the copper connection end) may be inserted into the RRU, RRH, etc.) to create an active optical cable assembly. Active optical cables (AOC) represent a cabling technology that accepts the same electrical inputs as a traditional copper cable, but uses optical fiber between connectors. Thus, the SFP converts an optical signal to an electrical signal. Active optical cables use optical-to-electrical conversion on the cable ends to improve speed and distance performance of the cable without sacrificing compatibility with standard electrical interfaces.

Generally speaking, mating optical connectors mechanically couple and align the cores of optical fibers so light can pass. The better the connector, the better the optical cleanliness of the connection (i.e., less light is lost due to reflection or misalignment of the optical fibers). The optical connector interface (e.g., on the optical connector of the optical assembly and/or on the optical connector/adapter of the SFP) is very small and delicate (e.g., glass), and is susceptible to dust, scratches, etc. which can affect the optical cleanliness of the connection. Therefore, during installation, a technician must have a proper tool to inspect the ends for a clean and scratch-less optical interface. If the ends are dirty, the technician also must have a cleaning tool and requires that the technician have special skills to perform these tasks. In addition, the technician must also test the optical assembly for damage. Even after inspecting and cleaning the optical interface, in many instances, it is discovered during activation of the RRU that the SFP is defective. Currently, there is not a way for the technician to test the SFP in the field without installing it into the RRU. Thus, there may be a need for an optical cable assembly that would allow for better optical cleanliness when used with, for example, a remote radio unit (RRU).

SUMMARY

A first aspect of the present invention is directed to a sealing boot for protecting an optical interconnection. The sealing boot includes a main body having an interior cavity, the interior cavity having an annular recess adjacent to one end of the main body, the annular recess configured to receive a feature of a remote radio unit; and a neck merging with the opposing end of the main body and having a cylindrical inner surface that defines a bore that is continuous with the cavity of the main body, the inner surface having an inner diameter that is less than an inner diameter of the interior cavity of the main body. The sealing boot is configured to surround at least a portion of a fixed active optical connector when the fixed active optical connector is plugged into the remote radio unit.

Another aspect of the present invention is directed to a sealing boot for protecting an optical interconnection. The sealing boot includes a generally cylindrical main body having an interior cavity; a corrugated cable section extending from one end of the main body having an interior cavity that is continuous with the interior cavity of the main body; a neck merging with the opposing end of the corrugated cable section and having a cylindrical inner surface that defines a bore that is continuous with the interior cavity of the corrugated cable section, the inner surface having an inner diameter that is less than an inner diameter of the interior cavity of the main body; and one or more securing features configured to secure the sealing boot to a remote radio unit. The main body is configured to surround at least a portion of a fixed active optical connector when the fixed active optical connector is plugged into the remote radio unit.

Another aspect of the present invention is directed to an active optical cable assembly. The assembly includes a fixed active optical connector having a transceiver, the fixed active optical connector being configured to be plugged into a remote radio unit; a ruggedized cable integrated with the fixed active optical connector; a main cable assembly integrated with the ruggedized cable; and a removable sealing boot configured to surround and form an interference fit with at least a portion of the fixed optical connector and be secured to the remote radio unit, thereby protecting an optical interconnection between the fixed active optical connector and the remote radio unit.

Another aspect of the present invention is directed to an active optical cabling system. The system includes a remote radio unit having at least one input port and an active optical cable assembly. The assembly includes a fixed active optical connector having a transceiver, the fixed active optical connector being a small form-factor pluggable (SFP) active optical connector configured to be plugged into the at least one input port of the remote radio unit; a ruggedized cable integrated with the fixed active optical connector; a main cable assembly integrated with the ruggedized cable; and a removable sealing boot configured to be secured to the remote radio unit. The fixed active optical connector is plugged into the at least one input port of the remote radio unit, and the sealing boot is secured to the remote radio unit and surrounds at portion of the fixed active optical connector extending outwardly from the remote radio unit, thereby protecting the optical interconnection between the fixed active optical connector and the remote radio unit.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
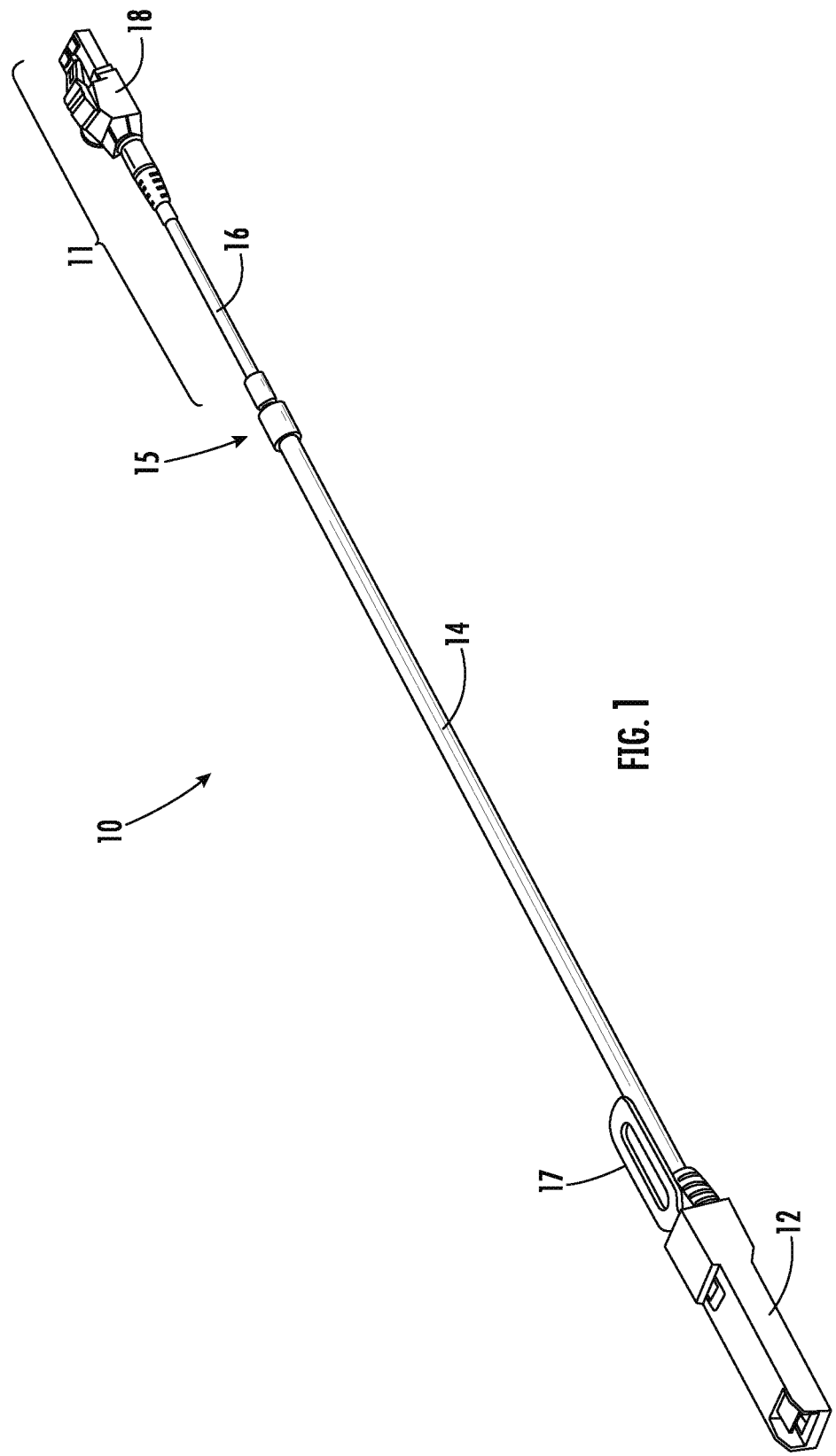
FIG. 1 is a perspective view of an active optical cable assembly according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10''').

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Pursuant to embodiments of the present invention, sealing boots for protecting optical interconnections are provided that may enhance the optical cleanliness of an optical connection between an active optical connector and a remote radio unit. Embodiments of the present invention will now be discussed in greater detail with reference to FIGS. 1-10B.

Referring now to the drawings, an active optical cable assembly 10 according to embodiments of the present is shown in FIG. 1. As can be seen in FIG. 1, the cable assembly 10 may include a fiber optic cable 14. In some embodiments, the fiber optic cable 14 may be a ruggedized fiber optic cable. At one end of the ruggedized fiber optic cable 14, a fixed active optical connector (with transceiver) 12 (e.g., an active optical connector) may be integrated with the cable 14. The fixed optical connector 12 is configured to be inserted into (i.e., plugged into) and received by an input port 32 of a remote radio unit 30 (see, e.g., FIG. 4A). For example, in some embodiments, the fixed active optical connector 12 may be a small form-factor pluggable (SFP) optical connector. As discussed above, the SFP converts an optical signal to an electrical signal. Integrating an SFP optical connector 12 into the optical assembly 10 of the present invention eliminates the optical connector interface issue described above. Thus, no special tools are required to test or clean the optical connectors, thereby helping to reduce installation time and costs associated therewith. In addition, because the non-integrated end of the SFP optical connector 12 is an electrical contact, the optical assembly 10 is easier to handle by a technician (i.e., not as delicate as an optical connector interface). Moreover, by eliminating the connector (optical assembly) to connector (SFP) optical connection, insertion loss (IL) and return loss (RL) may be improved, thereby increasing optical cleanliness. Furthermore, the active optical cable assembly 10 of the present invention (i.e., having an integrated SFP optical connector 12) can be tested prior to installation, thereby eliminating a technician discovering that an SFP is defective during RRU activation.

In some embodiments, the fixed active optical connector 12 may have a pull tab 17 attached thereto. The pull tab 17 may be used by a technician to grip when removing (i.e., pulling) the fixed optical connector 12 from the input port 32 of the remote radio unit 30. In some embodiments, the pull tab 17 may be used to help secure or lock the fixed connector 12 in place within the remote radio unit 30.

The active optical cable assembly 10 of the present invention may further include a main cable assembly 11. In some embodiments, the main cable assembly 11 may comprise one or more fiber optic cables 16 with active optical connectors 18 (i.e., an optical cable assembly). In some embodiments, the main cable assembly 11 may be a hybrid cable assembly. For example, the hybrid cable assembly may comprise a hybrid cable with an optical fiber, copper conductors, AISG cables, etc. In some embodiments, each fiber optic cable 14, 16 (i.e., the ruggedized fiber optic cable 14 and the one or more fiber optic cables 16 of the cable assembly 11) includes at least one optical fiber (not shown) that may be spliced together at a splice transition area (i.e., within a protective enclosure 15). In some embodiments, the optical fibers may be fusion spliced together. In some embodiments, the optical fibers may comprise ribbonized optical fibers.

Figure 2A:
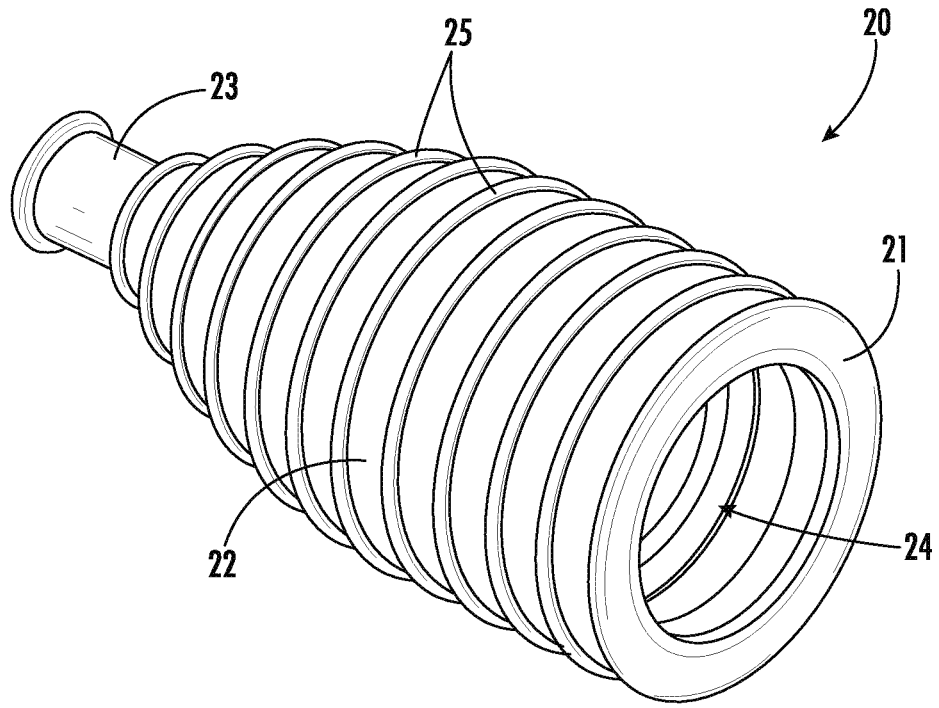
FIG. 2A is a perspective view of a sealing boot according to embodiments of the present invention.
Figure 2B:
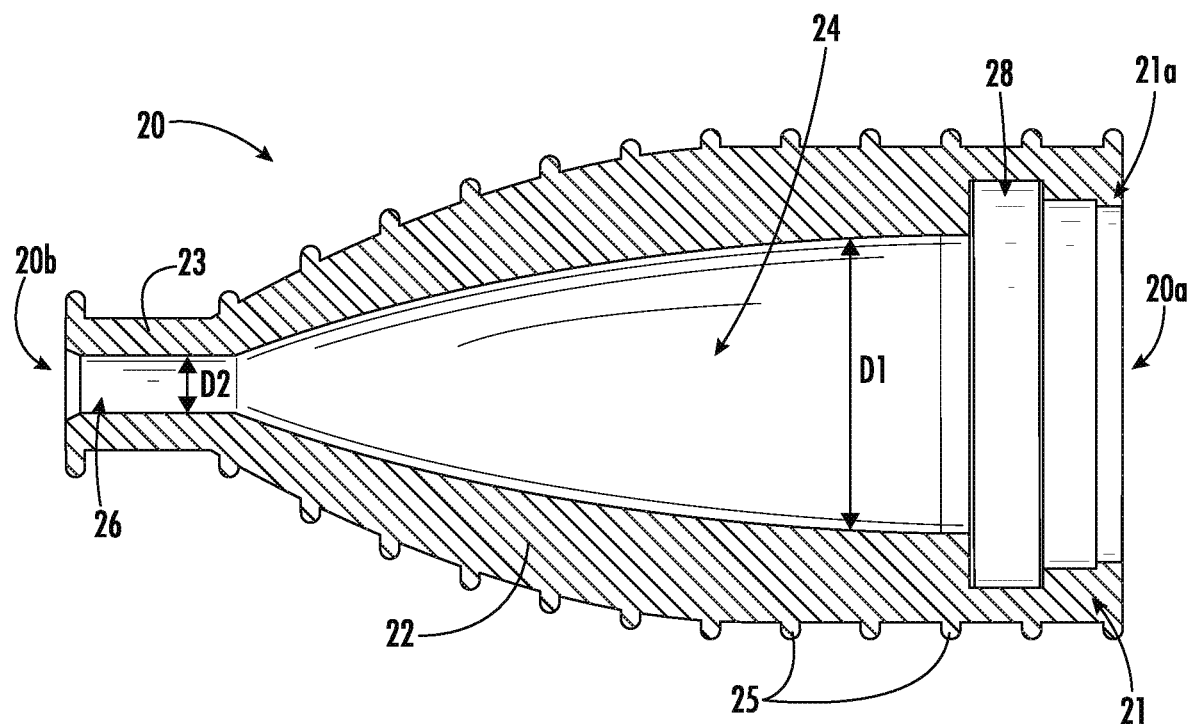
FIG. 2B is a cross-sectional side view of the sealing boot of FIG. 2A.

Referring now to FIGS. 2A-2B, a sealing boot 20 for protecting an optical interconnection according to embodiments of the present invention is illustrated. As shown in FIGS. 2A-2B, the sealing boot 20 includes a main body 22 having an interior cavity 24. The interior cavity 24 has an annular recess 28 adjacent to a connector end 20a of the main body 22. As described in further detail below, the annular recess 28 may be configured to receive a feature 34 of a remote radio unit 30, for example, a securing flange 34 or other feature of a mating interface 30a (see, e.g., FIGS. 4A-4B and FIG. 9). In some embodiments, the main body 22 of the sealing boot 20 may be generally cylindrical and tapered from the connector end 20a to a cable end 20b.

One skilled in the art will appreciate that cable end 20b and connector end 20a are provided as position references for both the interconnection and individual elements of the connector and seal portions along a longitudinal axis of the sealing boot 20. Therefore, each element identified has both a cable end 20b and a connector end 20a, these being the sides of each element closest to the cable end 20b and the connector end 20a of the boot 20, along the longitudinal axis of the boot 20.

At the cable end 20b, the sealing boot 20 further includes a neck 23 merging with the opposing end of the main body 22 and having a cylindrical inner surface that defines a bore 26 that is continuous with the interior cavity 24 of the main body 22. As shown in FIG. 2B, the inner surface of the neck 23 has an inner diameter (D2) that is less than an inner diameter (D1) of the interior cavity 24 of the main body 22. The larger inner diameter (D1) of the interior cavity 24 is configured to surround at least a portion of a fixed active optical connector 12 (and pull tab 17), for example, when the fixed active optical connector 12 is plugged into a remote radio unit 30 (see, e.g., FIG. 4A). The smaller inner diameter (D2) of the inner surface of the neck 23 allows the neck 23 to grip the ruggedized cable 14 of an active optical cable assembly 10, thereby helping to provide a weather-tight seal between the sealing boot 20 and the cable 14 (see, e.g., FIG. 4A).

In some embodiments, at least a portion of the interior cavity 24 of the sealing boot 20 may be configured to form an interference fit with a fixed active optical connector 12. For example, the interior cavity 24 of the sealing boot 20 may be molded to correspond with the shape of the fixed active optical connector 12, allowing the sealing boot 20 to form an interference fit with the optical connector 12 when the sealing boot 20 is slid onto the fixed active optical connector 12. Forming an interference fit between the sealing boot 20 and optical connector 12 may help to reduce vibration and/or mechanical shock on the optical connector 12, thereby helping to increase the optical cleanliness, for example, between the fixed active optical connector 12 and a remote radio unit 30.

In some embodiments, the sealing boot 20 may further comprise annular ribs 25 formed on the outer surface of the main body 22 to enhance an installer's grip on the boot 20.

The sealing boot 20 may be formed of any number of materials, but is typically formed of a polymeric or an elastomeric material, such as polyurethane, rubber, acrylonitrile butadiene styrene (ABS), or the like, that can recover to its original shape after significant deformation. The sealing boot 20 is typically formed as a unitary member, and in particular, may be formed via injection molding. See also, e.g., U.S. Pat. No. 10,090,661 to Vaccaro, the disclosure of which is incorporated by reference herein in its entirety.

Figure 3:
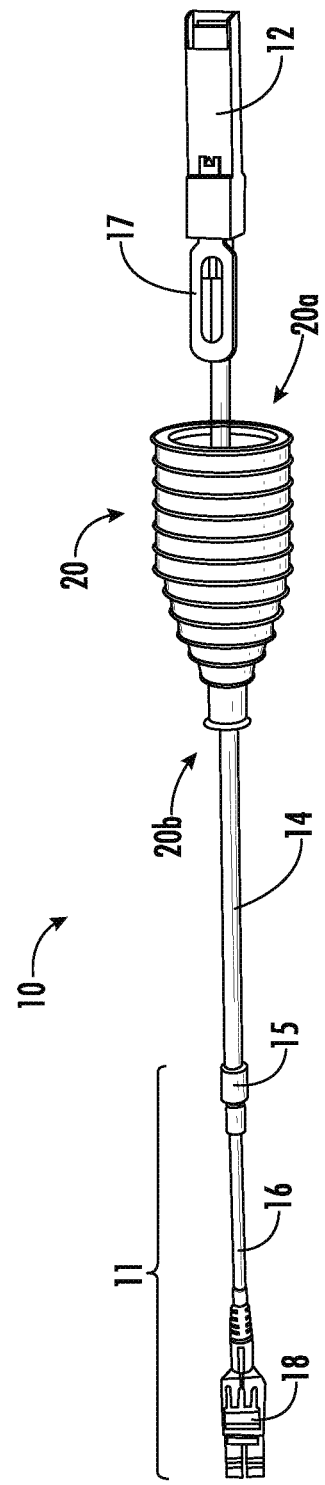
FIG. 3 is a perspective view of the sealing boot of FIGS. 2A-2B on the active optical cable assembly of FIG. 1.
Figure 4A:
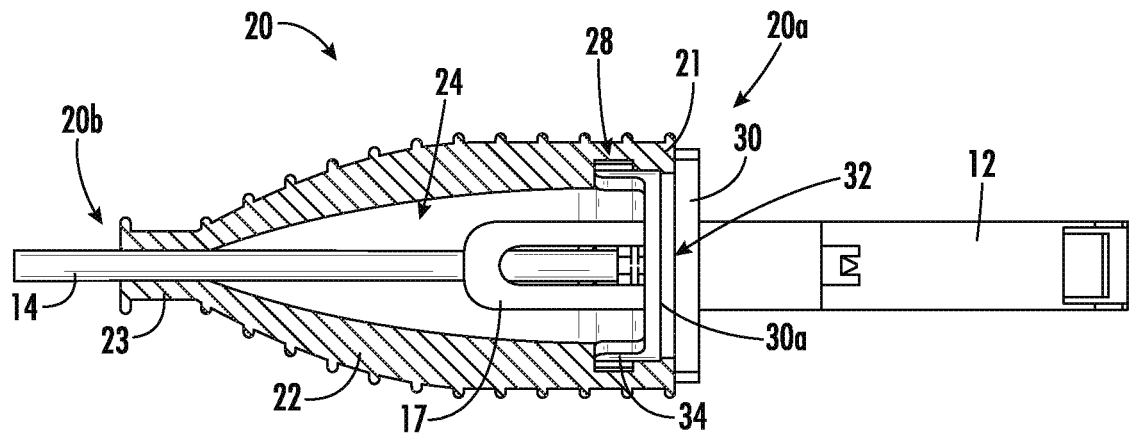
FIG. 4A is a cross-section side view of the sealing boot of FIGS. 2A-2B secured to a remote radio unit and protecting the connection between the fixed optical connector and remote radio unit.
Figure 4B:
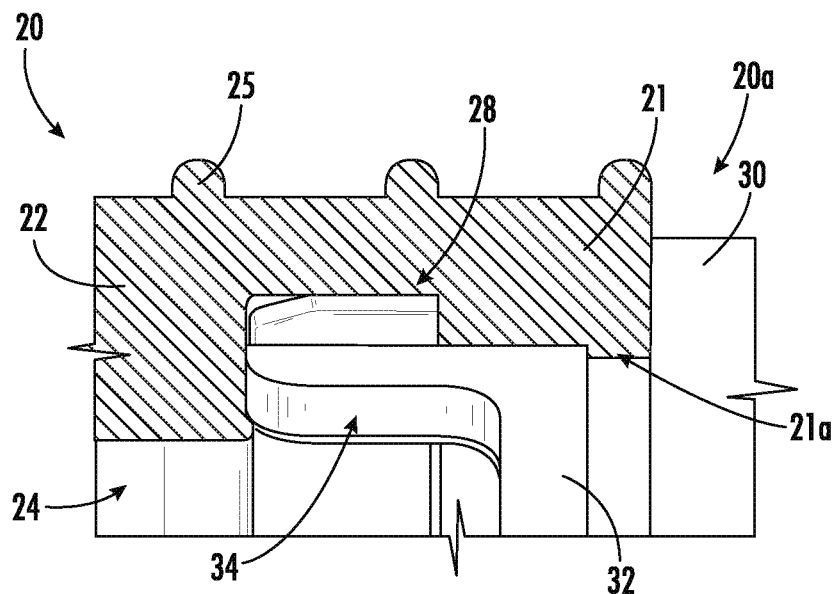
FIG. 4B is an enlarged view of the connection between the active optical connector and the remote radio unit of FIG. 4A showing engagement of the external securing feature of the sealing boot with the remote radio unit.

Referring to FIG. 3 and FIGS. 4A-4B, the sealing boot 20 may be used in combination with an active optical cable assembly 10 to protect an optical connection with a remote radio unit 30. As shown in FIG. 3, the sealing boot 20 may be placed onto the active optical cable assembly 10 with the connector end 20a facing the fixed active optical connector 12 and the cable end 20b facing the main cable assembly 11.

FIG. 4A shows the sealing boot 20 of the present invention protecting an optical interconnection between a fixed active optical connector 12 and a remote radio unit 30. The fixed active optical connector 12 is plugged into an input port 32 of the remote radio unit 30. As shown in FIG. 4A, the sealing boot 20 may be slid along the ruggedized cable 14 of the active optical cable assembly 10 until the connector end 20a (i.e., the annular recess 28) of the sealing boot 20 engages a securing flange 34 of mating interface 30a adjacent to the input port 32 of the remote radio unit 30 (see also, e.g., FIG. 9). The polymeric or elastomeric material that forms the sealing boot 20 gives the sealing boot 20 a certain degree of flexibility and resilience, such that the edge 21 of the connector end 20a of the sealing boot 20 may be stretched to allow the annular recess 28 to engage the securing flange 34 extending from the remote radio unit 30. After the annular recess 28 is engaged with the securing flange 34, the resilient nature of the polymeric or elastomeric material allows the edge 21 of the connector end 20a of the sealing boot 20 to recover to its original diameter, thereby securing the sealing boot 20 to the remote radio unit 30 (see also, e.g., FIG. 4B). In some embodiments, the edge 21 of the connector end 20a comprises a lip 21a. The lip 21a may have a smaller inner diameter than the edge 21 of the sealing boot 20, thereby providing an additional seal with the remote radio unit 30.

As shown in FIGS. 4A-4B, the connector end 20a of the sealing boot 20 grips the mating interface 30a to create an "external" weather-tight seal with the remote radio unit 30 and also secures the sealing boot 20 to the remote radio unit 30. At the cable end 20b of the sealing boot 20, the neck 23 grips the ruggedized cable 14 to create a weather-tight seal with the cable 14, thereby protecting the optical interconnection between the fixed active optical connector 12 and the remote radio unit 30.

Other known sealing boots may be modified to have a similar interior cavity as the sealing boot 20 described herein such that the sealing boots may be used with the active optical cable assembly 10 described herein, i.e., the sealing boots may be modified to have an interior cavity 24 configured to fit around the fixed active optical connector 12 and be secured to a mating interface 30a of a remote radio unit 30. Exemplary sealing boots that may be modified according to embodiment of the present invention include sealing boots described in U.S. Pat. Nos. 9,616,602 and 9,653,895 to Vaccaro, the disclosures of which are incorporated by reference herein in their entireties.

Figure 5A:
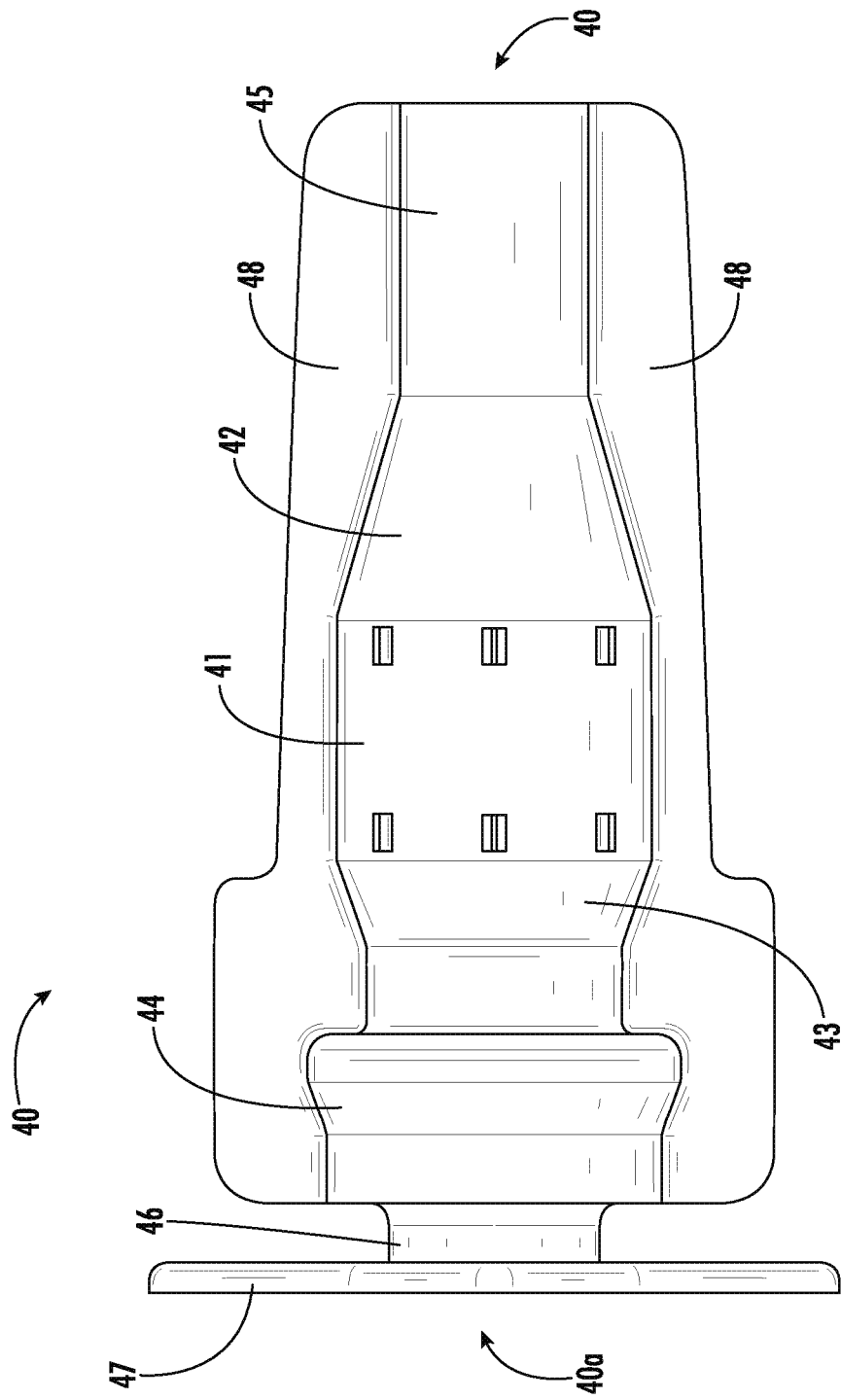
FIG. 5A is a side view of an alternative sealing boot according to embodiments of the present invention.
Figure 5B:
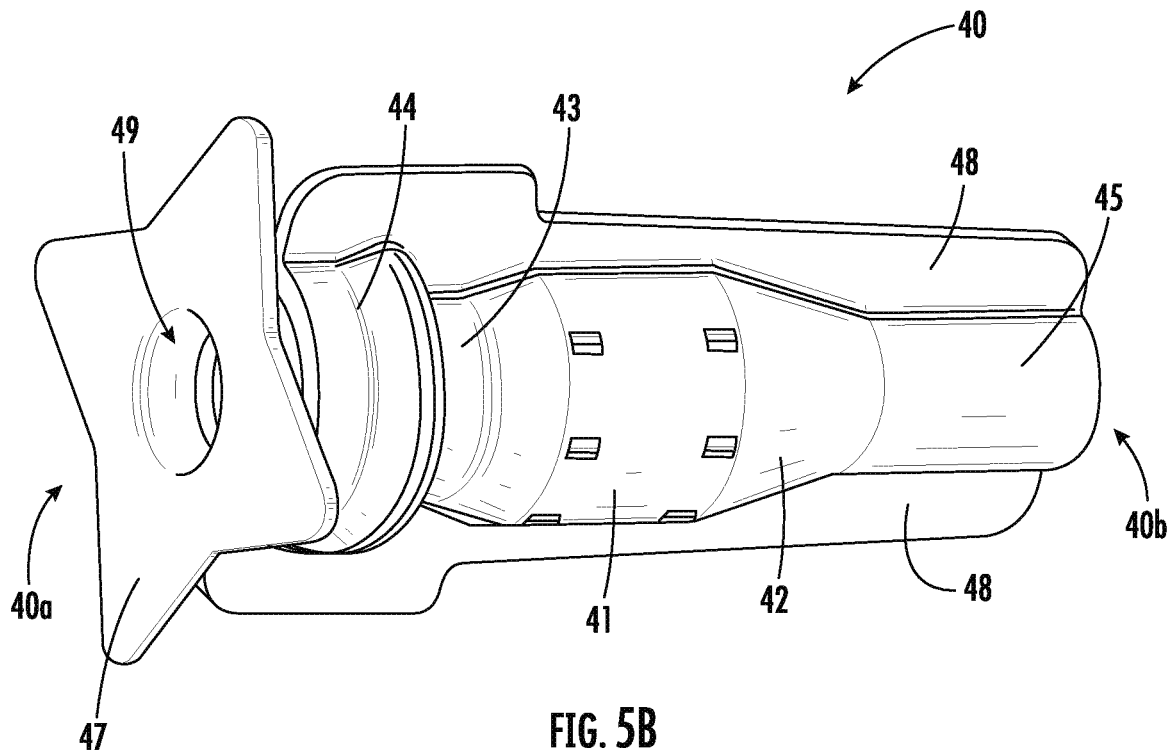
FIG. 5B is a front perspective view of the sealing boot of FIG. 5A.
Figure 5C:
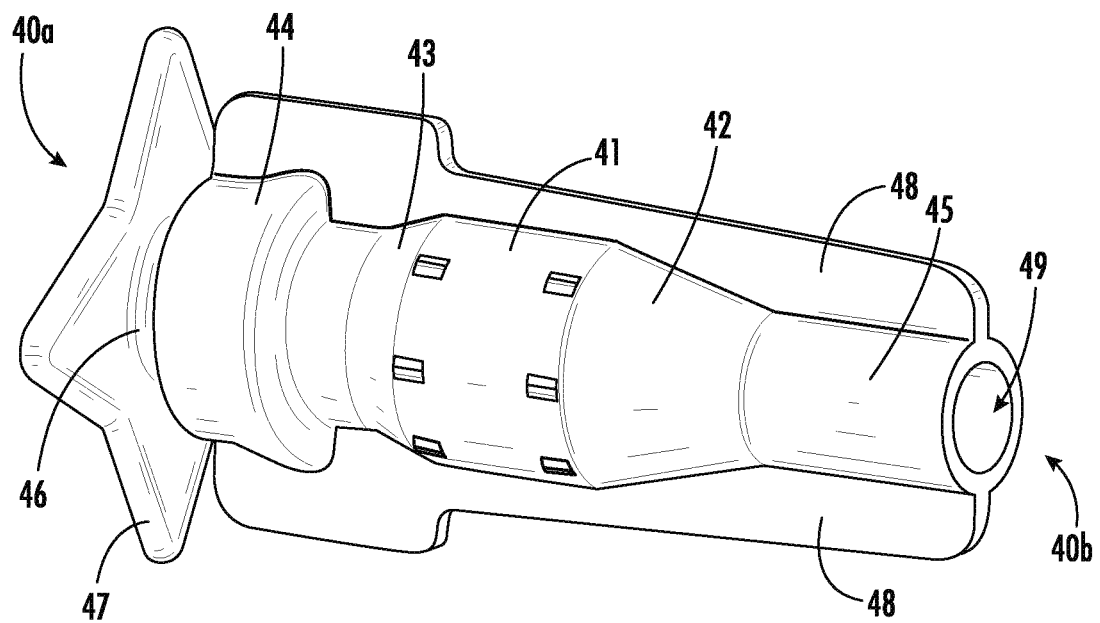
FIG. 5C is a rear perspective view of the sealing boot of FIGS. 5A-5B.

Referring to FIGS. 5A-5C, an exemplary sealing boot 40 that may be modified according to embodiments of the present invention is illustrated. The sealing boot 40 has a unitary elastic body 41 with a bore (or interior cavity) 49 therethrough. Sequenced from a cable end 40b to a connector (or remote radio unit) end 40a, the bore 49 has: a cable outer diameter seal portion 45 at the cable end 40b; the cable outer diameter seal portion 45 adjacent a connector cavity portion 42, 43; the connector cavity portion 42, 43 adjacent a input receptacle cavity portion 44; the remote radio unit cavity portion 44 adjacent a connector neck seal portion 46; and a bulkhead seal 47 adjacent the connector neck seal portion 46, at the connector end 40a. For ease of grip, the bulkhead seal 47 may be provided with an outer diameter greater than an outer diameter of the sealing boot 40, for example equal to or greater than an outer diameter of the remote radio unit cavity portion 44.

Additional exterior surface features may be applied to reinforce the seal and/or provide grip surfaces for pulling the seal over the sealing boot 40 and into the longitudinally aligned sealing position with the fixed active optical connector 12 and/or remote radio unit 30. For example as shown in FIGS. 5A-5C, a plurality of grip fins 48 may be provided protruding radially from an outer diameter of the sealing boot 40. The grip fins 48 may be aligned parallel to a longitudinal axis of the sealing boot 40, extending, for example, between the cable end 40b of the sealing boot 40 and a connector end 40b of the remote radio unit cavity portion 44. Where two grip fins 48 are applied, the grip fins 48 may be aligned at opposing sides along a longitudinal cross section of the sealing boot 40.

Similar to the sealing boot 20 described herein, the sealing boot 40 may be formed of any number of materials, but is typically formed of a polymeric or an elastomeric material, such as polyurethane, rubber, acrylonitrile butadiene styrene (ABS), or the like, that can recover to its original shape after significant deformation, thereby allowing the connector end 40b of the sealing boot 40 to be stretched to engage the remote radio unit cavity portion 44 with a feature 34 of the input port 32 of a remote radio unit 30. The sealing boot 40 is typically formed as a unitary member, and in particular, may be formed via injection molding.

The presence of the grip fins 48 may assist the stretching of the sealing boot 40 for installation and/or removal by providing ready grip surfaces as each portion of the sealing boot 40 is advanced over the active optical cable assembly 10 and secured onto a remote radio unit 30. Because the grip fins 48 have a limited circumferential extent, they do not inhibit deformation of the various portions of the sealing boot 40 for momentary stretching/advancement over the active optical cable assembly 10.

Figure 6:
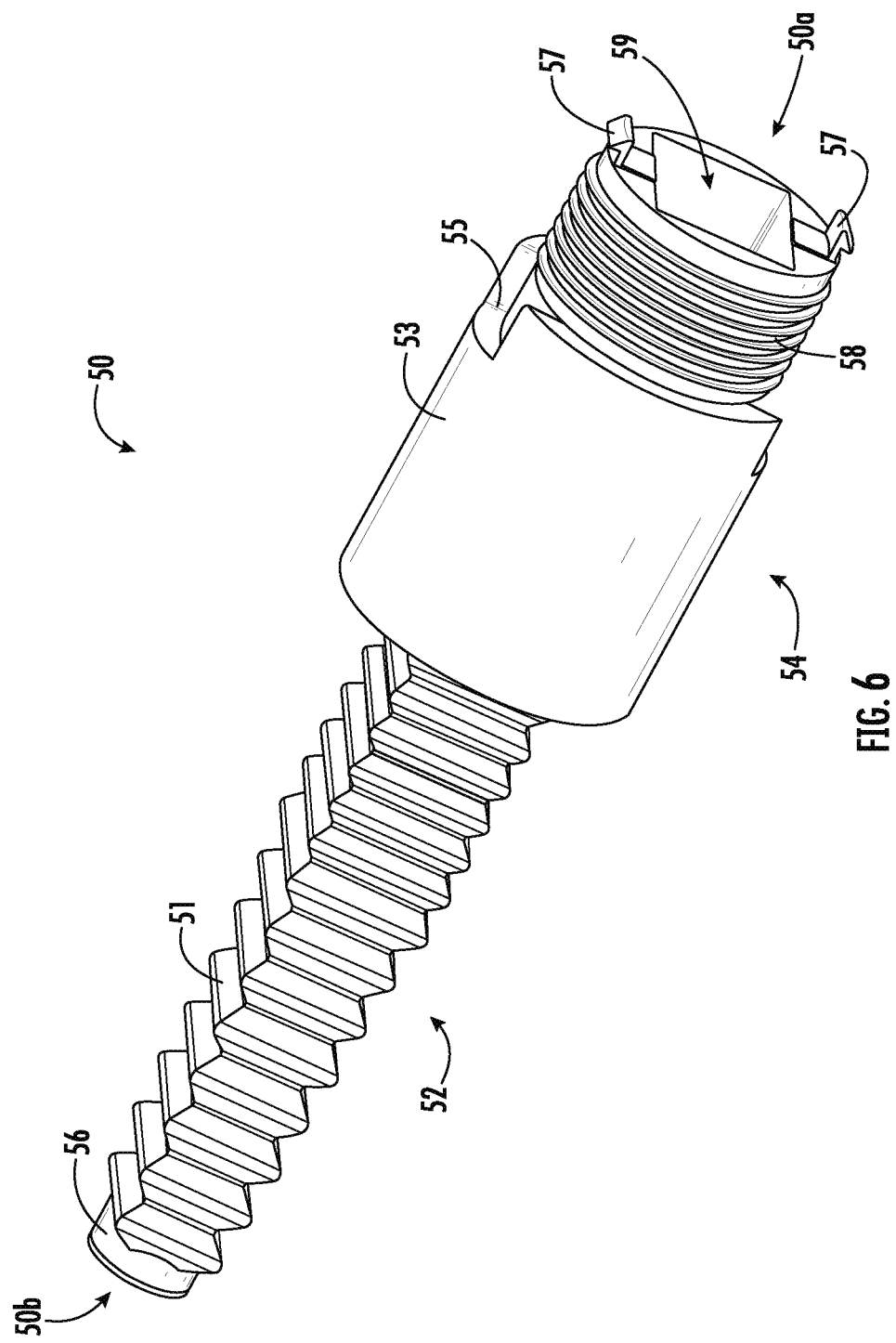
FIG. 6 is a perspective view of a sealing boot according to embodiments of the present invention.
Figure 7:
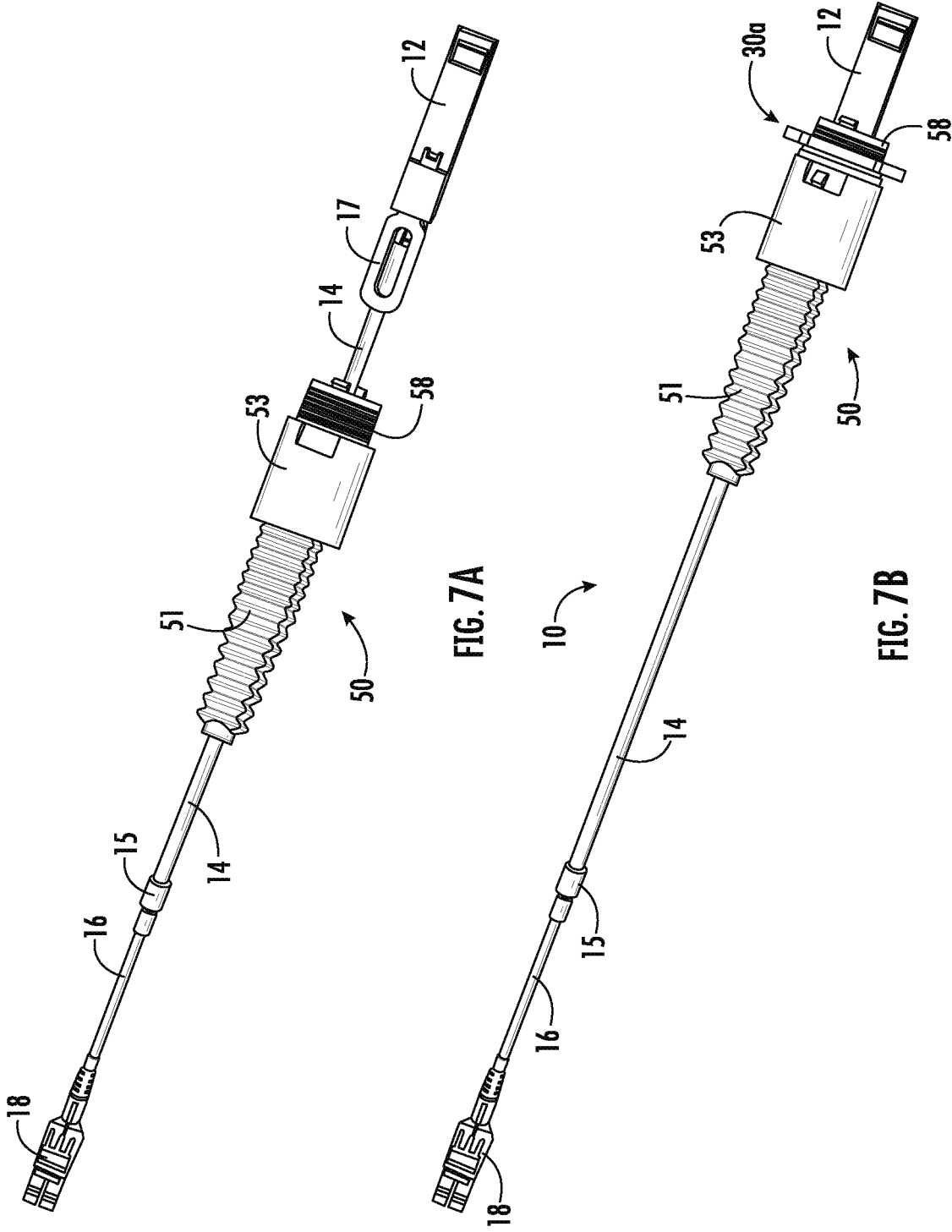
FIG. 7A is a perspective view of the sealing boot of FIG. 6 on the active optical cable assembly of FIG. 1.
FIG. 7B is a perspective view of the active optical cable assembly of FIG. 7A with the sealing boot covering a portion of the fixed optical connector.
FIG. 7C is an enlarged side view of the sealing boot surrounding a portion of the fixed optical connector.
FIG. 7D is an enlarged side view of an additional securing feature of the sealing boot of FIG. 6.

Referring now to FIG. 6, an alternative sealing boot 50 for protecting an optical interconnection according to embodiments of the present invention is illustrated. As shown in FIG. 6, the sealing boot 50 may include a generally cylindrical main body 53 having an interior cavity 59. In some embodiments, the main body 53 may have a different shape, for example, rectangular. In some embodiments, the main body 53 may comprise a threaded or ribbed section 58. For example, in some embodiments, the threaded section 58 may be an over-molded seal rib. In other embodiments, the threaded section 58 may comprise a series of grooves and O-rings. As discussed in further detail below, in some embodiments, the threaded section 58 may be configured to engage the mating interface 30a of a remote radio unit 30 (e.g., FIG. 9). In some embodiments, the seal boot 50 may further include a corrugated cable section 52 extending from one end of the main body 53. The corrugated cable section 52 has an interior cavity 59a that is continuous with the interior cavity 59 of the main body 53. The corrugations 51 formed on the outer surface of the cable section 52 may help to enhance an installer's grip on the boot 50. The corrugations 51 may be formed in a variety of shapes; for example, the corrugations 51 may be rectangular or cylindrical.

At the cable end 50b, the sealing boot 50 further includes a neck 56 merging with the corrugated cable section 52 and having a cylindrical inner surface that defines a bore 56a that is continuous with the interior cavity 59a of the corrugated cable section 52 and interior cavity 59 of the main body 53. Similar to the sealing boot 20, the inner surface of the neck 56 has an inner diameter that is less than an inner diameter of the interior cavity 59 of the main body 53. The larger inner diameter of the interior cavity 59 is configured to surround at least a portion of a fixed active optical connector 12 (and pull tab 17), for example, when the fixed active optical connector 12 is plugged into a remote radio unit 30 (see, e.g., FIGS. 7B and 7C). The smaller inner diameter of the inner surface of the neck 56 allows the neck 56 to grip the ruggedized cable 14 of an active optical cable assembly 10, thereby helping to provide a weather-tight seal between the sealing boot 50 and the cable 14 (see, e.g., FIG. 7C).

Figure 8:
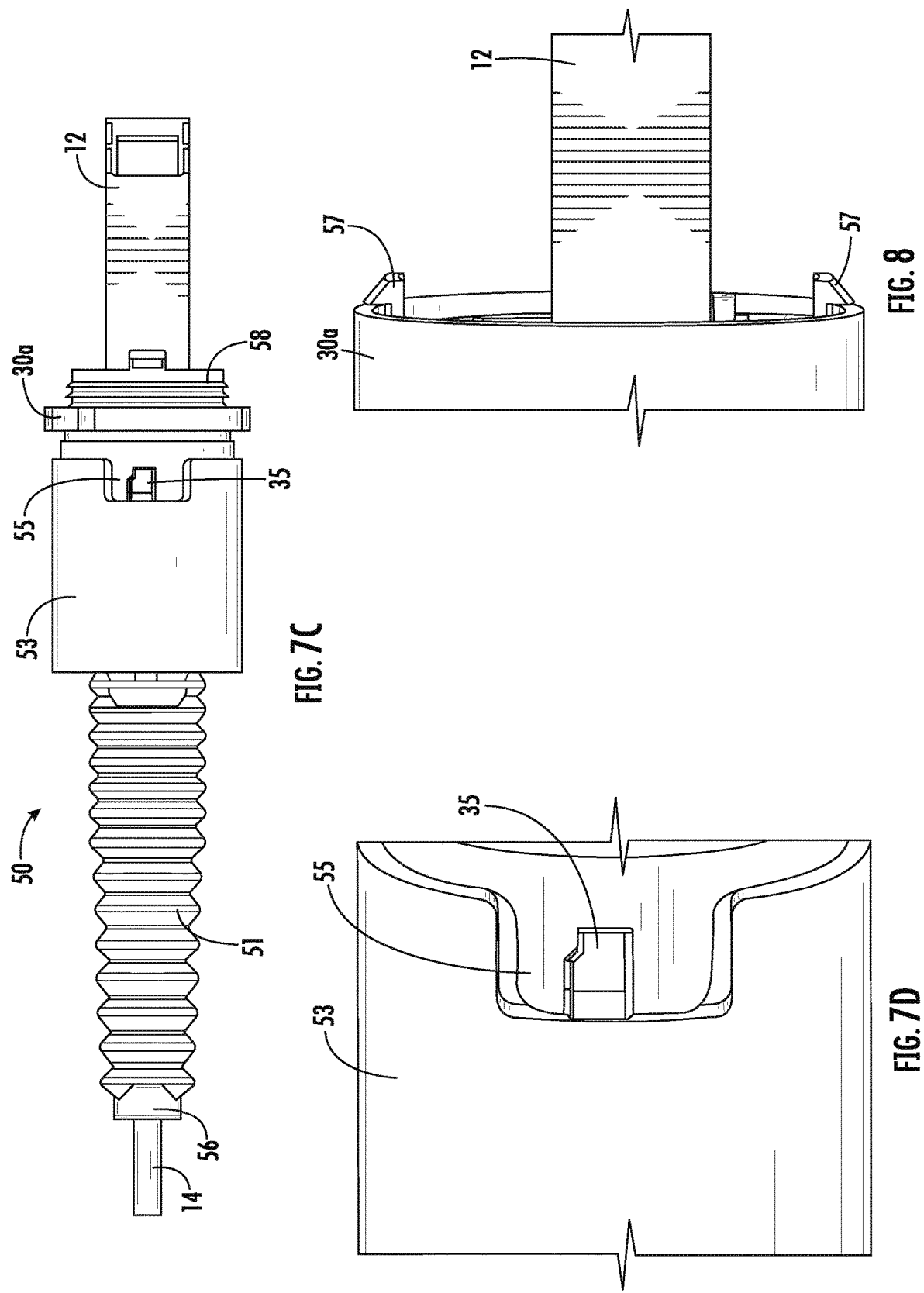
FIG. 8 is an enlarged side view of the connection between the active optical connector and the remote radio unit of FIG. 7C showing engagement of the internal securing feature of the sealing boot with the remote radio unit.
Figure 9:
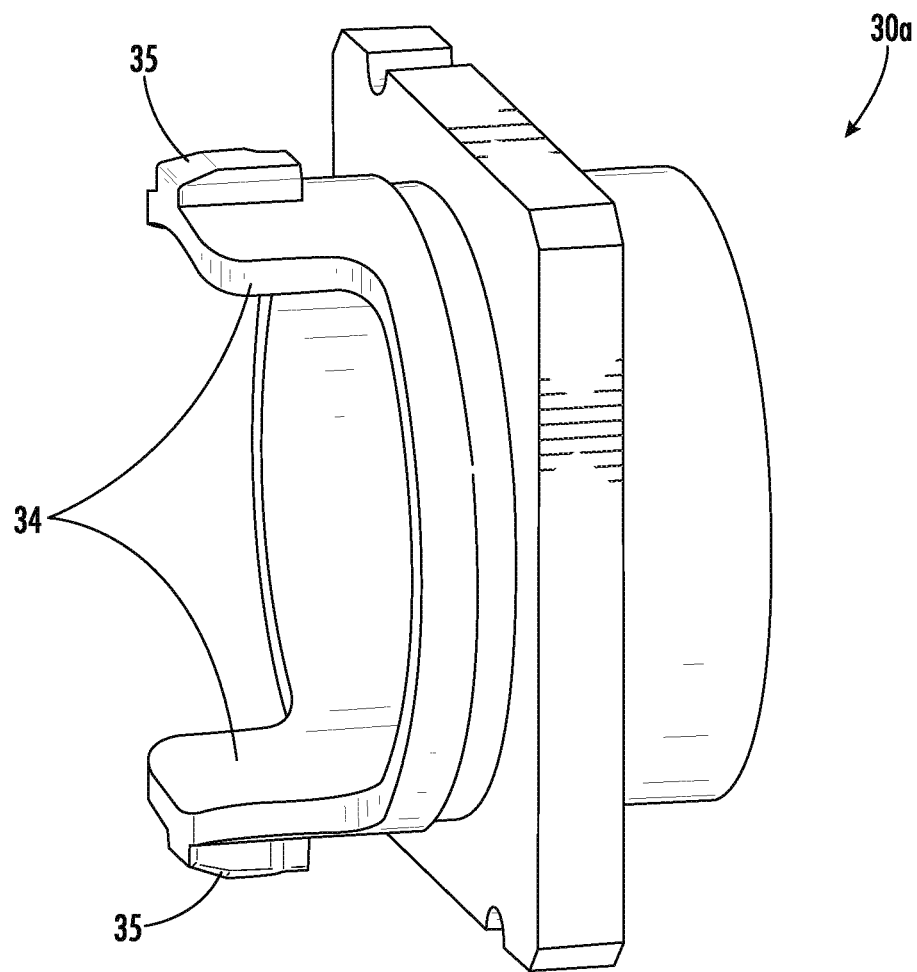
FIG. 9 is an exemplary mating interface of a remote radio unit that a sealing boot of the present invention may be configured to be secured.

In some embodiments, the sealing boot 50 may comprise one or more securing features 55, 57 adjacent to a connector end 50a of the main body 53 (see also, e.g., FIG. 7D and FIG. 8). As described in further detail below, the securing features 55, 57 (in addition to threaded section 58) may be configured to engage a mating interface 30*a* of a remote radio unit 30 (see, e.g., FIG. 9 and FIGS. 10A-10B) and secure the sealing boot 50 to the remote radio unit 30 (see, e.g., FIG. 7C and FIG. 8).

In some embodiments, at least a portion of the interior cavity 59 of the sealing boot 50 may be configured to form an interference fit with a fixed active optical connector 12. For example, as shown in FIG. 6, the interior cavity 59 of the sealing boot 50 may be molded to correspond with the shape of the fixed active optical connector 12, allowing the sealing boot 50 to form an interference fit with the optical connector 12 when the sealing boot 50 is slid onto the fixed active optical connector 12. Forming an interference fit between the sealing boot 50 and optical connector 12 may help to reduce vibration and/or mechanical shock on the optical connector 12, thereby helping to increase the optical cleanliness, for example, between the fixed active optical connector 12 and a remote radio unit 30.

Similar to the sealing boots 20, 40 described herein, the sealing boot 50 may be formed of any number of materials, but is typically formed of a polymeric or an elastomeric material, such as polyurethane, rubber, acrylonitrile butadiene styrene (ABS), or the like, that can recover to its original shape after significant deformation. The sealing boot 50 is typically formed as a unitary member, and in particular, may be formed via injection molding.

Referring to FIGS. 7A-7D and FIG. 8, the sealing boot 50 may be used in combination with an active optical cable assembly 10 to protect an optical connection with a remote radio unit 30. As shown in FIGS. 7A-7B, the sealing boot 50 may be placed onto the active optical cable assembly 10 with the connector end 50*a* facing the fixed active optical connector 12 and the cable end 50*b* facing the main cable assembly 11 and slid along the ruggedized cable 14 to surround at least a portion of the fixed active optical connector 12.

Figure 10A:
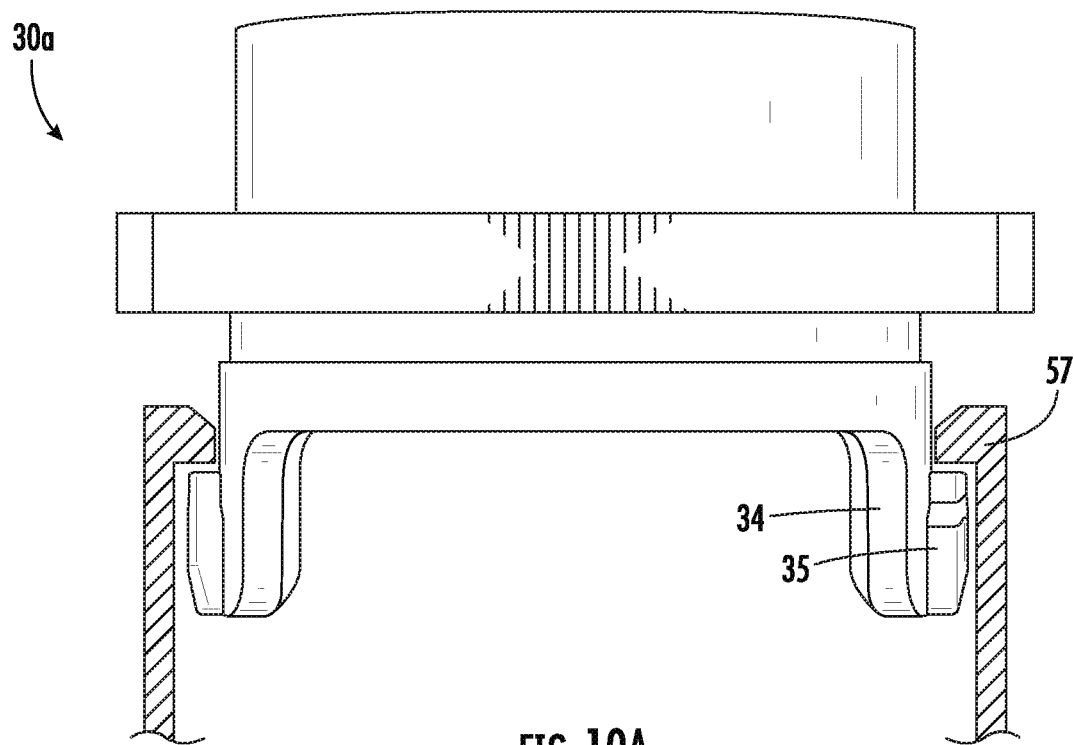
FIGS. 10A-10B illustrate exemplary methods of securing a sealing boot of the present invention to the mating interface of FIG. 9.
Figure 10B:
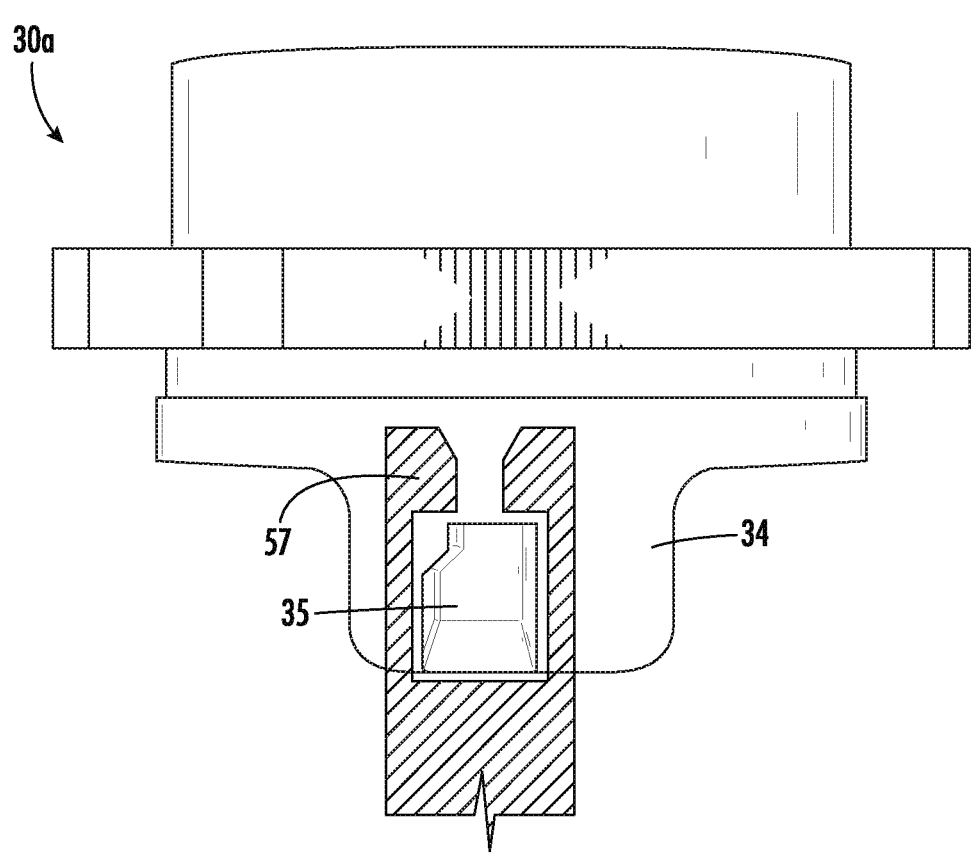

FIG. 7C shows the sealing boot 50 of the present invention protecting an optical interconnection between a fixed active optical connector 12 and a remote radio unit 30. The fixed active optical connector 12 is plugged into an input port 32 of the remote radio unit 30. As shown in FIG. 7B, the sealing boot 50 may be slid along the ruggedized cable 14 of the active optical cable assembly 10 until the connector end 50*a* (i.e., threaded section 58) of the sealing boot 50 engages a mating interface 30*a* of the remote radio unit 30. In some embodiments, as shown in FIG. 7C, the mating interface 30*a* has corresponding threads configured to receive the threaded section 58 of the sealing boot 50 (i.e., the sealing boot 50 may be secured to the remote radio unit 30 by screwed the threaded section 58 into the mating interface 30*a*). In some embodiments, as shown in FIG. 8, the sealing boot 50 may be slid into the mating interface 30*a* until securing feature 57 engages an edge of the mating interface 30*a*. For example, securing feature 57 may be a snap-fit feature that deflects radially inward as the sealing boot 50 is slid into the mating interface 30*a* until an edge of the mating interface 30*a* allows the resilient nature of the securing feature 57 to engage the edge of the mating interface 30*a*, thereby securing the sealing boot 50 to the remote radio unit 30. In some embodiments, the securing feature 57 may deflect radially outward as the sealing boot 50 is slid onto the mating interface 30*a* until an edge of the mating interface 30*a* allows the resilient nature of the sealing boot 50 to engage an edge of the mating interface 30*a*. FIGS. 10A-10B illustrate alternative exemplary ways the securing features 57 may engage (e.g., snap-fit) with a protrusion 35 of the mating interface 30*a* according to embodiments of the present invention.

As shown in FIGS. 7C-7D, in some embodiments, the main body 53 of the sealing boot 50 may further comprise an additional securing feature 55. In some embodiments, securing feature 55 may be configured to engage the remote radio unit 30 to help prevent rotation of the sealing boot 50 when the sealing boot 50 is secured to the remote radio unit 30. For example, in some embodiments, securing feature 55 may be a recess or other retention feature configured to receive a protrusion 35 of the mating interface 30*a* (see also, e.g., FIG. 9).

As shown in FIG. 7C and FIG. 8, the connector end 50*a* of the sealing boot 50 is secured to an inner surface of the mating interface 30*a* to create an "internal" weather-tight seal with the mating interface 30*a* (and remote radio unit 30) and also secure the sealing boot 50 to the remote radio unit 30. At the cable end 50*b* of the sealing boot 50, the neck 56 grips the ruggedized cable 14 to create a weather-tight seal with the cable 14, thereby protecting the optical interconnection between the fixed active optical connector 12 and the remote radio unit 30.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A sealing boot for protecting an optical interconnection, the sealing boot comprising:
    a generally cylindrical main body having an interior cavity;
    a corrugated cable section extending from one end of the main body having an interior cavity that is continuous with the interior cavity of the main body;
    a neck merging with the opposing end of the corrugated cable section and having a cylindrical inner surface that defines a bore that is continuous with the interior cavity of the corrugated cable section, the inner surface having an inner diameter that is less than an inner diameter of the interior cavity of the main body; and
    one or more securing features configured to secure the sealing boot to a remote radio unit, wherein the main body is configured to surround at least a portion of a fixed active optical connector when the fixed active optical connector is plugged into the remote radio unit.

2. The sealing boot of claim 1, wherein one end of the main body comprises a threaded section configured to engage a feature of the remote radio unit.

3. The sealing boot of claim 2, wherein the threaded section engages the feature of the remote radio unit such that the sealing boot protects the optical interconnection between the fixed active optical connector and the remote radio unit.

4. The sealing boot of claim 1, wherein at least a portion of the interior cavity of the main body is configured to form an interference fit with the fixed active optical connector.

5. The sealing boot of claim 1 in combination with an active optical cable assembly comprising a ruggedized cable terminated with a fixed active optical connector that resides in at least a portion of the interior cavity of the main body, wherein the neck of the sealing boot grips the ruggedized cable.

6. The sealing boot of claim 5 in further combination with the remote radio unit, wherein the fixed active optical connector is plugged into the remote radio unit and one or more securing features are received by the remote radio unit such that the sealing boot protects the optical interconnection between the fixed active optical connector and the remote radio unit.

7. An active optical cable assembly, the assembly comprising:
   a fixed active optical connector having a transceiver, the fixed active optical connector being configured to be plugged into a remote radio unit;
   a ruggedized cable integrated with the fixed active optical connector;
   a main cable assembly integrated with the ruggedized cable; and
   a removable sealing boot configured to surround and form an interference fit with at least a portion of the fixed optical connector and be secured to the remote radio unit, thereby protecting an optical interconnection between the fixed active optical connector and the remote radio unit.

8. The active optical cable assembly of claim 7, wherein the sealing boot comprises:
   a main body having an interior cavity, the interior cavity having an annular recess adjacent to one end of the main body, the annular recess configured to receive a feature of a remote radio unit; and
   a neck merging with the opposing end of the main body and having a cylindrical inner surface that defines a bore that is continuous with the cavity of the main body, the inner surface having an inner diameter that is less than an inner diameter of the interior cavity of the main body,
   wherein the sealing boot is configured to surround at least a portion of a fixed active optical connector when the fixed active optical connector is plugged into the remote radio unit.

9. The active optical cable assembly of claim 7, wherein the sealing boot comprises:
   a generally cylindrical main body having an interior cavity;
   a corrugated cable section extending from one end of the main body having an interior cavity that is continuous with the interior cavity of the main body;
   a neck merging with the opposing end of the corrugated cable section and having a cylindrical inner surface that defines a bore that is continuous with the interior cavity of the corrugated cable section, the inner surface having an inner diameter that is less than an inner diameter of the interior cavity of the main body; and
   one or more securing features configured to secure the sealing boot to a remote radio unit, wherein the main body configured to surround at least a portion of a fixed active optical connector when the fixed active optical connector is plugged into the remote radio unit.

10. The active optical cable assembly of claim 9, wherein one end of the main body of the sealing boot comprises a threaded section configured to engage a feature of the remote radio unit.

11. An active optical cabling system, the system comprising:
   a remote radio unit having at least one input port; and
   an active optical cable assembly, the assembly comprising:
      a fixed active optical connector having a transceiver, the fixed active optical connector being a small form-factor pluggable (SFP) active optical connector configured to be plugged into the at least one input port of the remote radio unit;
      a ruggedized cable integrated with the fixed active optical connector;
      a main cable assembly integrated with the ruggedized cable; and
      a removable sealing boot configured to be secured to the remote radio unit,
   wherein the fixed active optical connector is plugged into the at least one input port of the remote radio unit, and
   wherein the sealing boot is secured to the remote radio unit and surrounds at portion of the fixed active optical connector extending outwardly from the remote radio unit, thereby protecting the optical interconnection between the fixed active optical connector and the remote radio unit.

12. The active optical cabling system of claim 11, wherein the sealing boot comprises:
   a main body having an interior cavity, the interior cavity having an annular recess adjacent to one end of the main body; and
   a neck merging with the opposing end of the main body and having a cylindrical inner surface that defines a bore that is continuous with the cavity of the main body, the inner surface having an inner diameter that is less than an inner diameter of the interior cavity of the main body
   wherein the annular recess receives a feature of the remote radio unit to secure the sealing boot to the remote radio unit.

13. The active optical cabling system of claim 11, wherein the sealing boot comprises:
   a generally cylindrical main body having an interior cavity;
   a corrugated cable section extending from one end of the main body having an interior cavity that is continuous with the interior cavity of the main body;
   a neck merging with the opposing end of the corrugated cable section and having a cylindrical inner surface that defines a bore that is continuous with the interior cavity of the corrugated cable section, the inner surface having an inner diameter that is less than an inner diameter of the interior cavity of the main body; and
   one or more securing features configured to secure the sealing boot to a remote radio unit, wherein the one or more securing features are received by the remote radio unit to secure the sealing boot to the remote radio unit.

14. The active optical cable assembly of claim 13, wherein one end of the main body of the sealing boot comprises a threaded section configured to engage a feature of the remote radio unit.

\* \* \* \* \*